（12）United States Patent
Dyer et al.

(10) Patent No.: US 9,228,864 B2
(45) Date of Patent: Jan. 5, 2016

(54) DISPLAYING GRAPHICS ON A INSTRUMENT MASK

(71) Applicant: Continental Automotive Systems, Inc., Auburn Hills, MI (US)

(72) Inventors: Kevin Dyer, Macomb Township, MI (US); Taochuan Wang, Novi, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 43 days.

(21) Appl. No.: 14/107,676

(22) Filed: Dec. 16, 2013

(65) Prior Publication Data

US 2014/0168933 A1 Jun. 19, 2014

Related U.S. Application Data

(60) Provisional application No. 61/738,433, filed on Dec. 18, 2012.

(51) Int. Cl.
*G01D 11/28* (2006.01)
*B60Q 3/00* (2006.01)

(52) U.S. Cl.
CPC . *G01D 11/28* (2013.01); *B60Q 3/00* (2013.01)

(58) Field of Classification Search
CPC ............ G01D 11/28; B60Q 3/00; F21V 1/12; F21V 11/00; F21V 11/16; F21V 11/02
See application file for complete search history.

(56) References Cited

U.S. PATENT DOCUMENTS

| 4,771,368 A | * | 9/1988 | Tsukamoto et al. | 362/29 |
| 4,811,179 A | * | 3/1989 | Komatsu et al. | 362/256 |
| 2002/0135713 A1 | * | 9/2002 | Kojima et al. | 349/110 |
| 2014/0036472 A1 | * | 2/2014 | Ishihara et al. | 362/23.14 |

FOREIGN PATENT DOCUMENTS

JP 2008-089479 * 4/2008

* cited by examiner

*Primary Examiner* — Bao Q Truong

(57) ABSTRACT

Systems, vehicles, and methods include an instrument mask that is configured to shield at least one instrument from external light and a graphic displayed on a surface of the instrument mask.

18 Claims, 6 Drawing Sheets

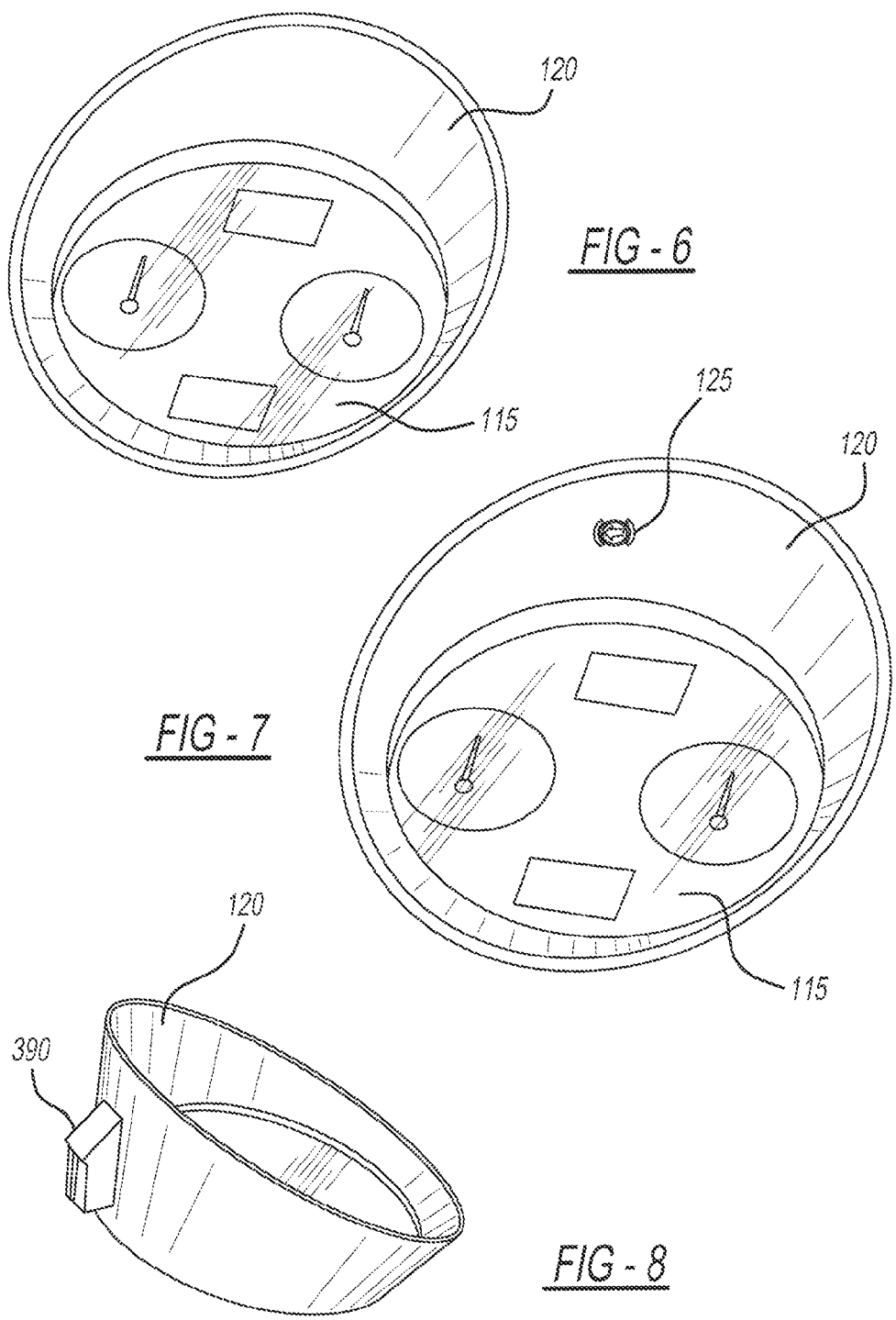

DISPLAYING GRAPHICS ON A INSTRUMENT MASK

This application claims the benefit of the filing date of U.S. Provisional Application Ser. No. 61/738,433 filed Dec. 18, 2012, the contents of the above-named application is incorporated herein by reference.

BACKGROUND

The invention relates generally to the field of displaying graphics through/on a mask used to shield one or more instruments from external light.

Often, instruments—especially lighted instruments—are hard to read in the sunlight as the sunlight—or other external lights—tend to wash out the light being emitted by the instruments. Typically, a mask or hood may be placed over the instruments to block the external light and make the instruments more visible and easier to read.

Instruments in vehicles often utilize such masks to make the instruments surrounded by these masks more visible. Typically, however, instruments (or other indicators) are not placed on the surfaces that are used as the mask. Accordingly, the surface(s) of the mask remain empty.

SUMMARY

In some implementations, a system includes an instrument mask. The instrument mask is configured to shield at least one instrument from external light. The system also includes a graphic displayed on a surface of the instrument mask.

In other implementations, a method includes displaying a graphic on a surface of an instrument mask. The instrument mask is configured to shield at least one instrument from external light.

In yet other implementations, a vehicle includes at least one instrument and an instrument mask that is configured to shield the instrument from external light. The vehicle also includes a graphic displayed on a surface the instrument mask.

Numerous additional embodiments are also possible.

BRIEF DESCRIPTION OF THE DRAWINGS

Other objects and advantages of the invention may become apparent upon reading the detailed description and upon reference to the accompanying drawings.

FIG. 6 is a perspective view illustrating the hood or mask system of the present invention with the graphic unilluminated;

FIG. 7 is a perspective view illustrating the hood or mask system of the present invention with the graphic unilluminated; and, FIG. 8 is a perspective view of the rear of the hood or mask system showing the lighting element of FIG. 3 in more detail.

Figure 1:
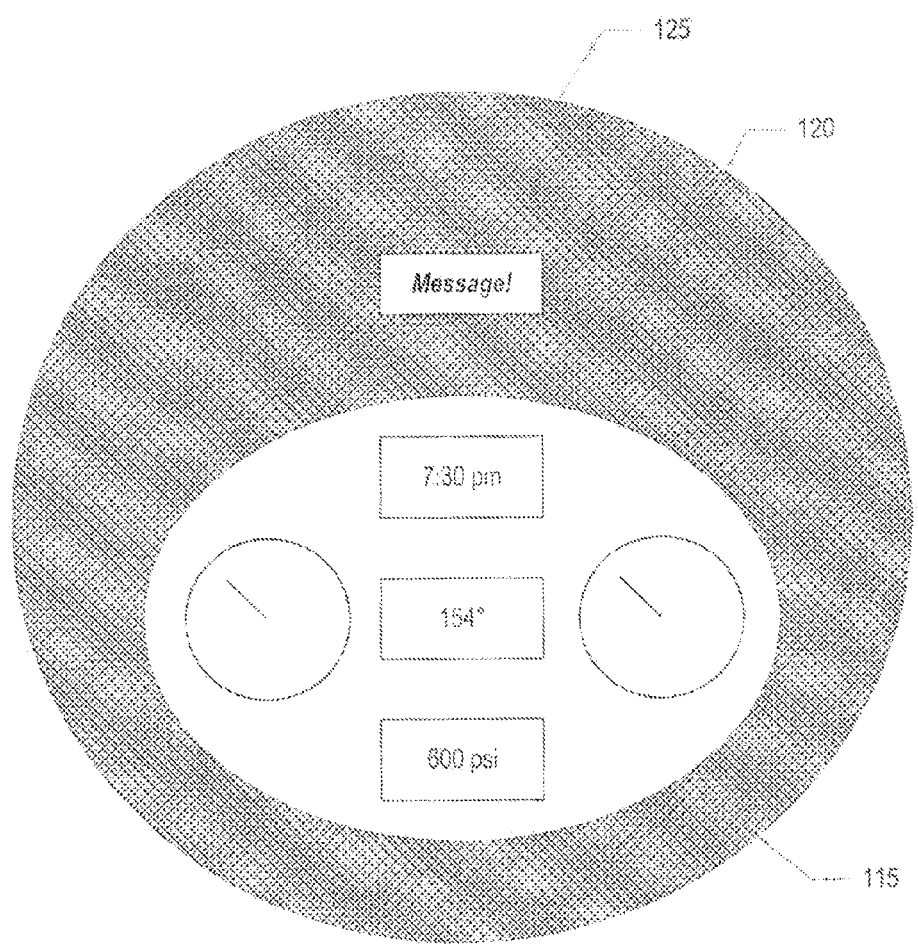
FIG. 1 is a diagram illustrating a graphic on an instrument mask surface, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

DETAILED DESCRIPTION

FIG. 1 is a diagram illustrating a graphic on an instrument mask surface, in accordance with some embodiments.

In some embodiments, instrument cluster 115 contains one or more instruments for reporting information to one or more users. In some embodiments, the instruments may be placed in a vehicle for displaying information to the driver and/or the passengers in the vehicle. The instruments may include gauges (such as a speedometer, a tachometer, a thermometer, etc.), tell-tales (such as turn signals, warning lights, etc.), general text/graphics (such as a map), etc. In addition, the instruments may include one or more displays that may be configured to simulate one or more traditional instruments as well as display additional information.

In some embodiments, the instruments may be used in settings with bright lights such as bright sunlight, etc. For example, instruments inside vehicles are often exposed to sunlight or other bright lights. Accordingly, hood/mask 120 may be used to protect the instruments in instrument cluster 115 from bright lights, thereby making the instruments 115 more visible/legible.

In some embodiments, the surface of mask 120 has a significant amount of area where additional information may be displayed. For example, graphic 125 may be displayed on the inside surface of mask 120. Graphic 125 may be to simple text message (such as branding, for example) or graphic 125 may be any other type of instrument as discussed above. For example, graphic 125 may be a gauge (such as a speedometer, a tachometer, a thermometer, etc.), a tell-tale (such as turn signals, warning lights, etc.), a graphic (such as a map), etc.

Figure 2:
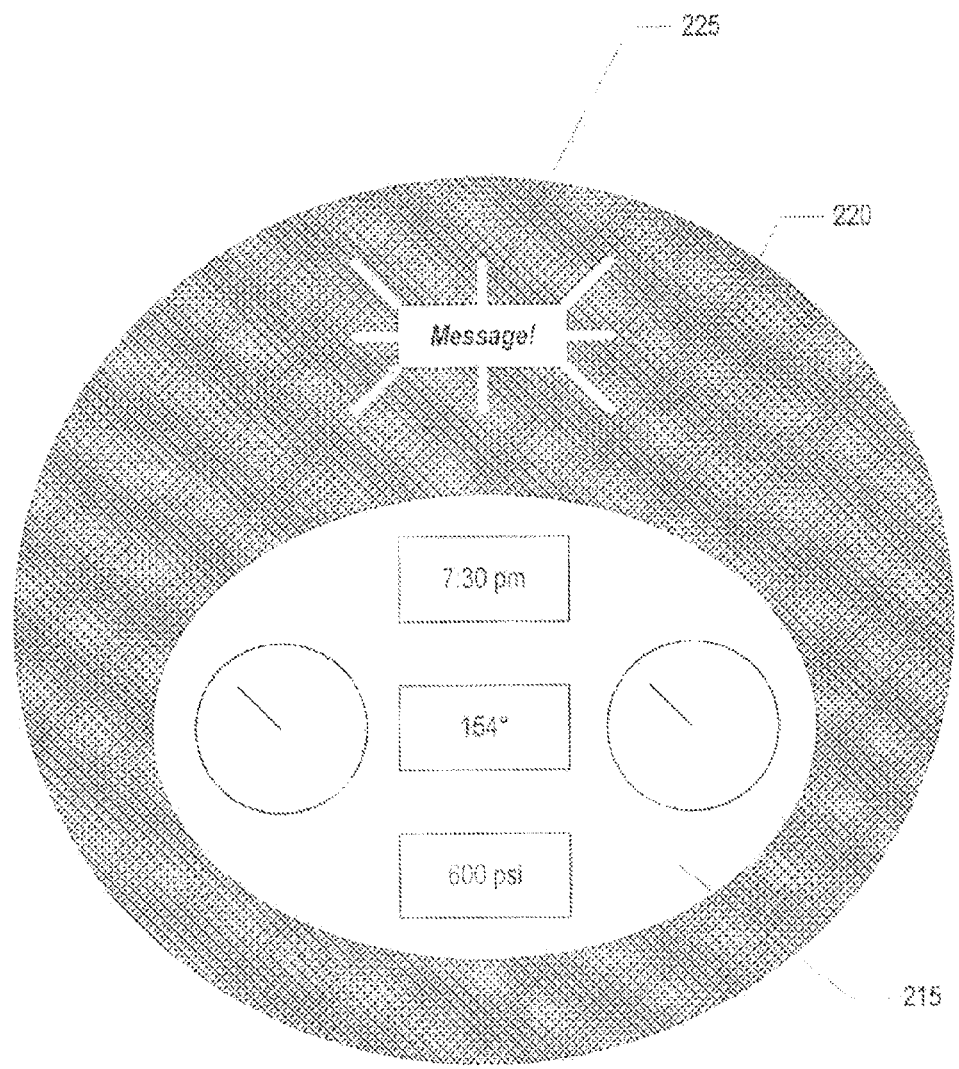
FIG. 2 is a diagram illustrating a lighted graphic on an instrument mask surface, in accordance with some embodiments.

FIG. 2 is a diagram illustrating a lighted graphic on an instrument mask surface, in accordance with some embodiments.

In some embodiments, instrument cluster 215 also contains one or more instruments for reporting information to one or more users. The instrument cluster is similar to instrument cluster 115 of FIG. 1.

In some embodiments, hood/mask 220 may be used to protect the instruments in instrument duster 215 from external lights, thereby making instruments 215 more visible/legible to the one or more users.

In some embodiments, the inside surface of mask 220 may be used to display graphic 225. Graphic 225 may be a simple text message (such as branding, for example) or graphic 225 could be any other type of instrument. For example, graphic 225 may be a gauge (such as a speedometer, a tachometer, a thermometer, etc.), a tell-tale (such as turn signals, warning lights, etc.), a graphic (such as a map), etc.

In some embodiments, graphic 225 may be illuminated in order to make the graphic more noticeable/visible, for example. In some embodiments, graphic 225 may be illuminated with an illumination system placed behind mask 220. In alternative embodiments, graphic 225 may be self-illuminated. In yet other embodiments, graphic 225 may be illuminated using an illumination system placed in front of graphic 225. For example, a projector configured to project an illumination beam may be placed on the surface of mask across from graphic 225.

Figure 3:
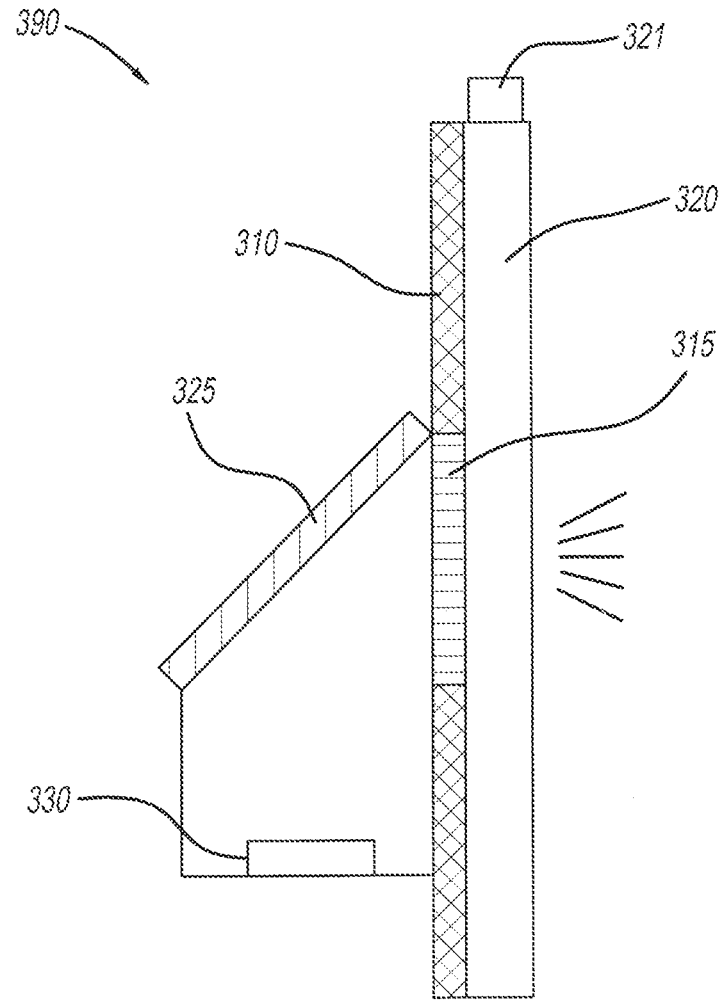
FIG. 3 is a diagram illustrating a system for lighting a graphic on an instrument mask surface, in accordance with some embodiments.

FIG. 3 is a diagram illustrating a system 390 for lighting a graphic on an instrument mask surface, in accordance with some embodiments.

In some embodiments, system 390 represents an example of how a graphic on an instrument mask surface may be backside-illuminated. In some embodiments, an opening may be created in mask 310 to accommodate graphic 315. In some embodiments, graphic 315 may be a printed applique, for example.

Light source 330 may be configured to generate light with which to illuminate graphic 315. Various types of light bulbs may be used such as incandescent, halogen, fluorescent, LED, etc. In some embodiments, light source 330 may be configured to shine upwards, and the light generated by light source 330 may be directed to the right towards graphic 315 using mirror 325. Accordingly, graphic 315 may be illuminated and the information in the graphic (as discussed above) may be presented to a user.

In some embodiments, optional glow tube 320 may be added over the surface of mask 310. Glow tube 320 may be configured to diffuse light passing through the glow tube having another light source 321. For example, glow tube 320 may be configured to diffuse light intended for illuminating one or more of the instruments shielded by mask 310. Accordingly, light generated by light source 330 may pass through graphic 315 to and then through glow tube 320 for a more diffused graphic effect for graphic 315.

In alternative embodiments, graphic 315 may be illuminated from the front of mask 310. A projector, for example, may be placed across from graphic 315 and may be configured to project light to graphic 315 for the purpose of illuminating graphic 315. In yet other embodiments, the graphic may be self-illuminated. The graphic, for example, may be a self-illuminated display, such as an LCD screen.

Figure 4:
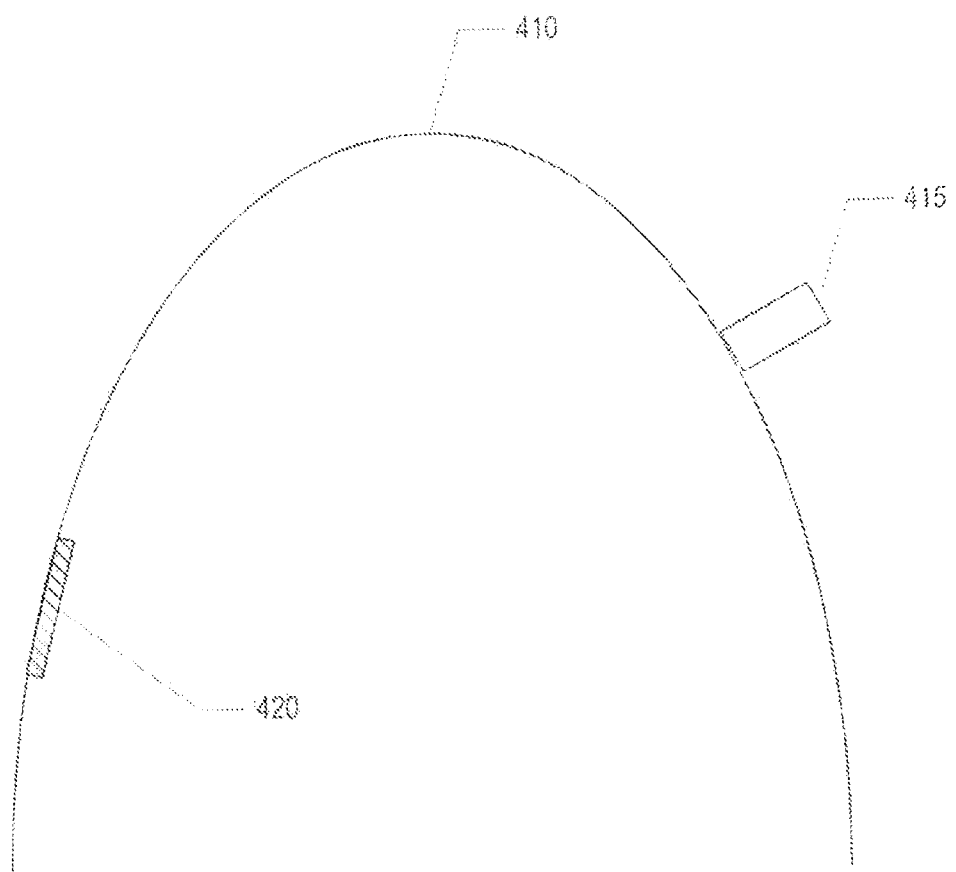
FIG. 4 is a diagram illustrating a projector for projecting as graphic on the instrument mask surface, in accordance with some embodiments.

FIG. 4 is a diagram illustrating a projector for projecting a graphic on the instrument mask surface, in accordance with some embodiments.

FIG. 4 illustrates an alternative implementation for displaying a graphic on the inside surface of the mask surrounding an instrument cluster. In some embodiments, projector 415 may be placed approximately across the surface of mask 410 from where it is desired to display graphic 420. As was discussed above, graphics 420 may be a simple text message (such as branding, for example) or graphic 420 could be any other type of instrument.

FIGS. 6-8 show a perspective view of the hood or mask 120 which extends over the instrument 115. As shown in the FIGS. 6-8 the hood or mask extends away from the face of the instrument display such that the instrument is shielded from external light. The graphic 125 is on the side of the hood.

In some embodiments, the inside surface of mask 410 near graphic 420 may be configured to receive the projection from projector 415. For example, a reflective sticker may be placed on the inside surface of mask 410 where the graphic is to be projected. In embodiments where a glow tube is included on the surface of mask 410, projector 415 may be configured to project graphic 420 on the glow tube for a more diffused effect.

Figure 5:
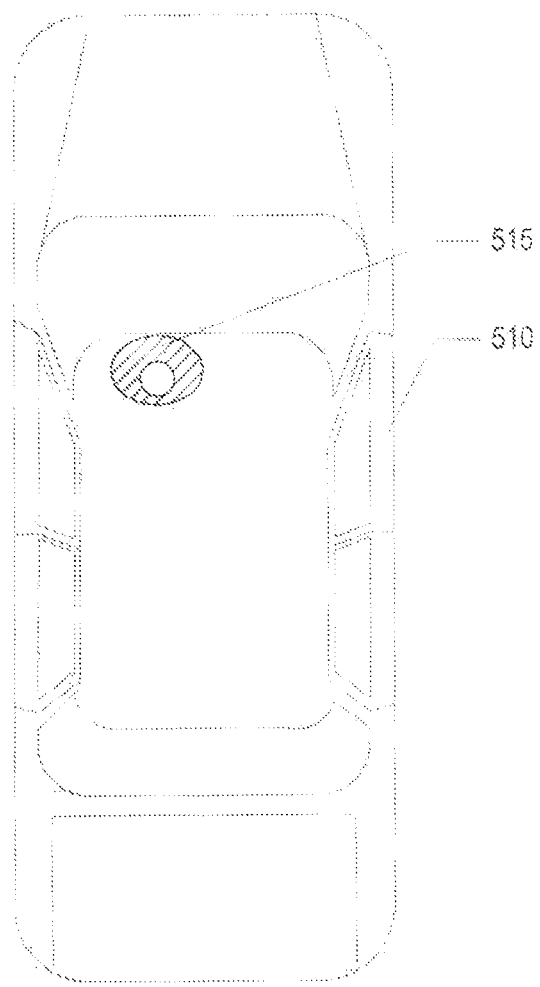
FIG. 5 is a diagram illustrating a vehicle having a graphic on an instrument mask surface, in accordance with some embodiments.

FIG. 5 is a diagram illustrating a vehicle having a graphic on an instrument mask surface, in accordance with some embodiments.

In some embodiments, vehicle 510 includes instrument system 515. Instrument system 515 may include an instrument cluster with one or more instruments for reporting information to one or more users. The instruments may include gauges (such as a speedometer, a tachometer, a thermometer, etc.), tell-tales (such as turn signals, warning lights, etc.), general text/graphics (such as a map), etc.

In some embodiments, the vehicle may be used in situations with bright external lights, such as bright sunlight. Accordingly, a mask may be used to shield the instruments from external light and make them more readable/visible. In some embodiments, a graphic may be displayed on the inside surface of the mask. Graphic 125 may be a simple text message (such as branding, for example) or graphic 125 could be any other type of instrument. For example, the graphic displayed on the inside surface of the mask may be a gauge (such as a speedometer, a tachometer, a thermometer, etc.), a tell-tale (such as turn signals, warning lights, etc.), a graphic (such as a map), etc.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system comprising:
an instrument hood or mask, wherein the instrument mask extends away from and is configured to shield at least one instrument from external light;
a graphic displayed on a surface of the instrument mask; and a light source configured to illuminate the graphic such that it is visible in the instrument hood or mask when illuminated.

2. The system of claim 1, further comprising a glow tube placed over the surface of the instrument mask, wherein the glow tube is configured to be illuminated by another light source and to disperse light to the instrument, wherein the glow tube is configured to allow the graphic to shine through the glow tube.

3. The system of claim 1, further comprising a projector configured to project the graphic to the surface of the instrument mask from another part of the surface of the surface of the instrument mask substantially across from the graphic.

4. The system of claim 1, further comprising a projector configured to project the graphic to the surface of the instrument mask from behind the graphic.

5. A method comprising displaying a graphic on a surface of an instrument hood or mask, wherein the instrument hood or mask extends away from and is configured to shield at least one instrument from external light and illuminating the graphic such that it is visible when illuminated.

6. The method of claim 5, further comprising illuminating the graphic using a light source through an opening in the instrument mask.

7. The method of claim 6, further comprising a glow tube placed over the surface of the instrument mask, wherein the glow tube is configured to be illuminated by another light source and to disperse light to the instrument, wherein the glow tube is configured to allow the graphic to shine through the glow tube.

8. The method of claim 5, further comprising projecting the graphic to the surface of the instrument mask from another part of the surface of the instrument mask substantially across from the graphic.

9. The method of claim 5, further comprising projecting the graphic to the surface of the instrument mask from behind the graphic.

10. A vehicle comprising:
    at least one instrument;
    an instrument hood or mask, wherein the instrument hood or mask extends away from and is configured to shield the instrument from external light;
    a graphic displayed on a surface the instrument hood or mask and
    a light source configured to illuminate the graphic.

11. The vehicle of claim 5, further comprising a light source configured to illuminate the graphic through an opening in the instrument mask.

12. The vehicle of claim 11, further comprising a glow tube placed over the surface of the instrument mask, wherein the glow tube is configured to be illuminated by another light source and to disperse light to the instrument, wherein the glow tube is configured to allow the graphic to shine through the glow tube.

13. The vehicle of claim 5, further comprising a projector configured to project the graphic to the surface of the instrument mask from another part of the surface of the surface of the instrument mask substantially across from the graphic.

14. The vehicle of claim 5, further comprising a projector configured to project the graphic to the surface of the instrument mask from behind the graphic.

15. A vehicle comprising:
    at least one instrument;
    an instrument hood or mask, wherein the instrument hood or mask extends away from, and is configured to shield the instrument from external light;
    a graphic displayed on a surface of the instrument hood or mask;
    wherein said hood or mask including a glow tube placed over the surface of the instrument mask, wherein the glow tube is configured to be illuminated to disperse light to the instrument, wherein the glow tube is configured to allow the graphic to shine through the glow tube; and
    a light source configured to illuminate the graphic through an opening in the instrument hood or mask such that said graphic is invisible when said Ii ht source is off but is visible through low tube when said ht source is illuminated.

16. The vehicle of claim 15, further comprising a light source configured to illuminate the graphic through an opening in the instrument mask.

17. The vehicle of claim 15, further comprising a glow tube placed over the surface of the instrument mask, wherein the glow tube is configured to be illuminated by another light source and to disperse light to the instrument, wherein the glow tube is configured to allow the graphic to shine through the glow tube.

18. The vehicle of claim 15, further comprising a projector configured to project the graphic to the surface of the instrument mask from another part of the surface of the surface of the instrument mask substantially across from the graphic.

* * * * *